United States Patent [19]

Andrews

[11] 4,348,156

[45] Sep. 7, 1982

[54] BLADE PITCH ACTUATION SYSTEM

[75] Inventor: Merritt B. Andrews, Westfield, Mass.

[73] Assignee: United Technologies Corporation, Hartford, Conn.

[21] Appl. No.: 130,656

[22] Filed: Mar. 17, 1980

[51] Int. Cl.³ .................. B64C 11/40; F03D 7/04
[52] U.S. Cl. .................... 416/48; 416/158; 416/49
[58] Field of Search ............ 416/48, 49, 46, 156–158; 91/420

[56] References Cited

U.S. PATENT DOCUMENTS

| | | | |
|---|---|---|---|
| 965,387 | 7/1910 | Hawxhurst | 416/48 |
| 2,319,592 | 5/1943 | Fiedler | 416/48 |
| 2,360,792 | 10/1944 | Putnum | 416/157 |
| 2,441,635 | 5/1948 | Iverson | 416/157 |
| 2,484,603 | 10/1949 | Audemar et al. | 416/156 |
| 2,724,447 | 11/1955 | Brooks | 416/154 |
| 2,807,327 | 9/1957 | Scott | 416/154 |
| 2,889,888 | 6/1959 | Fairhurst | 416/156 |
| 2,971,585 | 2/1961 | Whittle et al. | 416/157 |
| 2,986,219 | 5/1961 | Boardman, Jr. et al. | 416/48 |
| 3,269,121 | 8/1966 | Bening | 416/157 |
| 3,339,639 | 9/1967 | Elmes et al. | 416/154 |
| 3,635,583 | 1/1972 | Chilman et al. | 416/157 |
| 3,635,584 | 1/1972 | Chilman et al. | 416/157 |
| 3,820,917 | 1/1974 | Rakceric | 416/157 |
| 4,003,676 | 1/1977 | Sweeney et al. | 416/48 |
| 4,061,440 | 12/1977 | Belliere | 416/157 |
| 4,201,514 | 5/1980 | Huetter | 416/37 |

*Primary Examiner*—Everette A. Powell, Jr.
*Attorney, Agent, or Firm*—John Swiatocha

[57] ABSTRACT

Blade pitch actuation system wherein the blades are hydraulically maintained in phase with one another. The system comprises hydraulic actuators each adapted to drive a single blade in a pitch change mode of operation. Fluid flow to the actuators is controlled by a blade actuator control valve in fluid communication with the actuators and an hydraulic fluid source and drain. An input member of the control valve is provided with passages which provide selected communication between the hydraulic fluid source and drain and passages in cooperating control valve feedback members each operated by, and in fluid communication with one of the blade actuators. The input and feedback members are positionable along one another such that selective positioning of the input member causes simultaneous selected pressurization and draining of the blade actuators through the feedback members thereby effecting a desired, phased blade pitch setting. The phased movement of the blades to such setting causes a corresponding movement of the feedback members nulling the actuator control valve and preventing deviation in blade pitch from the desired setting.

11 Claims, 1 Drawing Figure

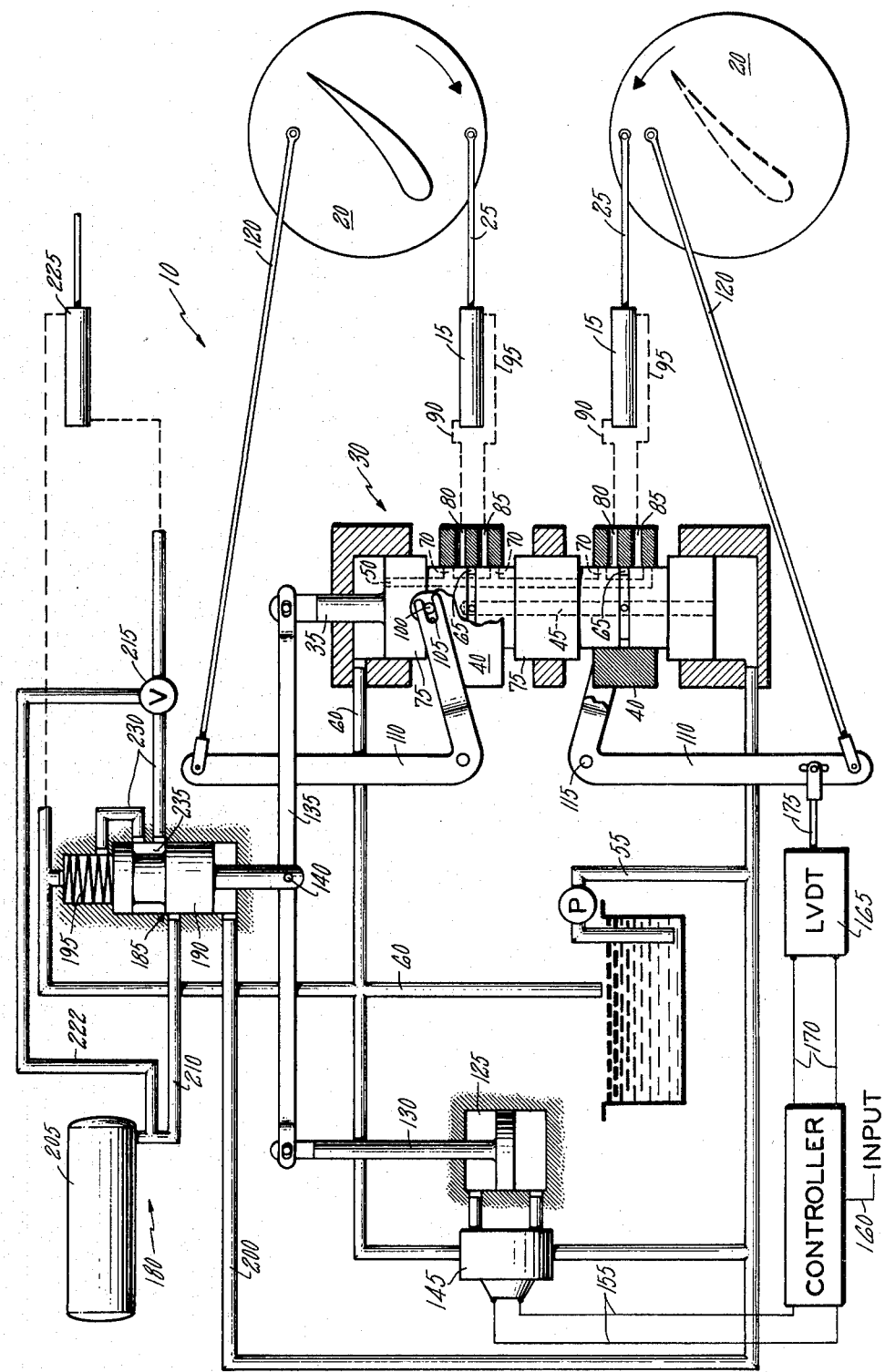

BLADE PITCH ACTUATION SYSTEM

The Government has rights in this invention pursuant to Contract No. NAS3-20058 awarded by the National Aeronautics and Space Administration.

This application is being filed on even date with U.S. patent application Ser. No. 130,657, for "Wind Turbine Blade Pitch Control System" in the name of Merrit B. Andrews; U.S. patent application Ser. No. 130,659, for "Wind Turbine Blade Pitch Adjustment System" in the names of Joseph P. Harry and Edward H. Kusiak; and U.S. patent application Ser. No. 130,658, for "Wind Turbine Blade Pitch Control System" in the names of Robert Sherman, Millard G. Mayo and Philip E. Barnes, all assigned to the assignee of the present invention.

TECHNICAL FIELD

This invention relates to variable pitch bladed devices and more particularly to a system for selectively adjusting the pitch of variable pitch wind turbine blades.

BACKGROUND ART

In variable pitch bladed devices such as aircraft propellers and wind turbines, it is imperative that the blades be phased or maintained at substantially identical pitch angles. One system for actuating large wind turbine blades in a pitch change mode of operation while maintaining uniform pitch phase of the blades, employs a slide block which rotates with, and is longitudinally slidable on the main shaft of the turbine. The slide block is connected by means of a plurality of solid links to the wind turbine blades, mounted on a rotational hub in such manner that the blades are pivotable about their own axes. The block is also connected to a plurality of fixed actuators through a bearing mechanism. When an adjustment in a blade pitch is desired, the actuators rectilinearly move the slide block over the shaft thereby moving the links which in turn pivot the blades, the phasing of the blades being maintained by the mechanical connections of these actuating system components. It will be appreciated that such a prior art system is not only massive and costly but requires that each blade and the mounts therefor be capable of withstanding the entire actuator output in the event of blade jamming or disconnection of the other blade or blades. To withstand such actuator output as well as normal, aerodynamic loading, the blades and their mounts must be rather massive further contributing to the cost and weight of the bladed device.

Various mechanical pitch changing mechanisms have been proposed for aircraft propellers, examples of such mechanisms being found in U.S. Pat. Nos. 1,908,894 to Findley and 3,163,232 to Grindle. In the Findley patent, the propeller blades are phased by connection of the blades to a gear set driven by a single electric motor. Such a gear connection, like the slide block mechanism discussed hereinabove, contributes significantly to the weight of the propeller hub thereby introducing substantial costs into the system. In the Grindle patent, an hydraulic motor powers the blades in a pitch change mode of operation by means of a rotating cam-bevel gear arrangement for phasing the blades. However, such an arrangement may also add substantial weight and complexity to the system.

Furthermore, such prior art pitch changing mechanisms employing mechanical blade phasing generally require the simultaneous feathering of all blades to shut the bladed device down. Accordingly, should one of the blades jam and fail to feather, the feathering of the remaining blades is jeopardized.

DISCLOSURE OF THE INVENTION

It is a principal object of the present invention to provide a blade pitch actuation system which overcomes the deficiencies of the prior art.

It is another object of the present invention to provide a blade pitch actuation system wherein the blade pitch angles are phased by apparatus which contributes minimally to the system weight and cost.

It is another object of the present invention to provide a blade pitch actuation system wherein the phasing of the blade pitch angles is achieved without massive mechanical connections between pitch actuation and mounting devices associated with the various blades.

It is another object of the present invention to provide a blade pitch actuation system wherein the system does not prevent independent feathering of the blades.

It is another object of the present invention to provide a blade pitch actuation system wherein the blade pitch angles are phased by means of fluid mechanical connections between the pitch change actuators associated with the blades.

These and other objects which will become more readily apparent from the following description of the best mode of carrying out the invention and the appended claims, are attained by the blade pitch actuation system of the present invention wherein variable pitch blades are hydraulically maintained in phase with one another. Each blade is driven in pitch change mode of operation by at least one hydraulic actuator. Fluid flow to the blade actuators is controlled by a blade actuator control valve which includes input and feedback members relatively movable along one another. The input member is positioned by any suitable means and responds to a command signal indicative of the blade pitch desired. The input member includes passages therein communicating with a primary source and drain of hydraulic fluid. These passages, on actuation of the input member, are disposed in selected communication with passages in the feedback members which communicate with the blade actuators. The blades operate the feedback members such that pivoting of the blades about their axes in a pitch change mode of operation moves the feedback members out of fluid communication with the input member thereby nulling the actuator control valve and preventing further pitch change movement of the blades until the input member is reactivated. In the preferred embodiment the input member is slidably received within the feedback members, one feedback member being associated with each variable pitch blade. The input and feedback members and the passages provided therein are so dimensioned, and the relative spacing of the feedback members along the input member is such that actuation of the input member effects identical relative disposition of that member with all the feedback members thereby assuring precise phasing of the blades.

The input member is positioned by a control valve actuator connected thereto by way of a lever, a feather actuator also being connected to the lever and adapted to actuate the control valve input member under conditions requiring feathering of the blades. Alternatively, the blades may be independently feathered by actuators pressurized by independent supplies of hydraulic fluid.

BRIEF DESCRIPTION OF THE DRAWING

The drawing is a schematic representation of the blade pitch actuation system of the present invention.

BEST MODE OF CARRYING OUT THE INVENTION AND INDUSTRIAL APPLICABILITY THEREOF

Referring to the drawing, the blade pitch control system of the present invention is shown generally at 10, comprising a plurality of hydraulic actuators 15 each including interiorly thereof an output member or piston (not shown) connected to a single variable pitch blade 20 at a base or root portion thereof by piston rod 25.

In a manner well known in the art, hydraulic fluid is supplied to and drained from actuators 15 on opposite sides thereof to effect selective movement of the pistons and rods 25, thereby effecting a select pitch angle setting of blades 20. The supply of hydraulic fluid to, and the drain of hydraulic fluid from actuators 15 as well as blade pitch phasing is controlled by actuator control valve 30 comprising an input member 35 received along selected portions thereof within feedback members 40. As shown, input member 35 is provided with hydraulic fluid passages 45 and 50, passages 45 communicating at one end of the input member, with an hydraulic fluid source and pump through a main system supply conduit 55, and passage 50 communicating at the opposite end of the input member with a drain through the main system drain line 60. Lines 45 and 50 are provided with radially extending outlet portions opening to the surface of the input member, the supply outlets being designated by 65 and the drain outlets being designated by 70.

The input member includes on a surace thereof, stop means or lands 75 which define therebetween portions of a reduced diameter which are received within the feedback members 40. As set forth hereinabove, input member 35 is slidable within feedback members 40, lands 75 limiting the extent of such travel.

Feedback members 40 are slidable over those portions of input member 35 which are received within the feedback members. The feedback members are provided with generally radially extending passages 80 and 85 adapted for registry and fluid communication with outlets 65 and 70 of input member 35. As shown, passages 80 connect with the lefthand ends of actuators 15 through lines 90 while passages 85 connect with the righthand ends of actuators 15 through passages 95.

It will be appreciated that while actuator control valve 30 is shown in a nulled position, i.e. wherein there is no communication between the passages in the input and feedback members, either moving the input member slightly downwardly through the feedback members or slightly raising the feedback members over the input member causes lines 80 and 90 to be disposed in fluid communication with passage 50 to the input member and drain line 60. Such relative positioning of the input and feedback members causes passages 85 and 95 to be disposed in fluid communication with passage 45 and supply line 55 thereby pressurizing the righthand ends of actuators 15 with hydraulic fluid for increasing the pitch setting of the blades as indicated by the arrows shown thereon. Similarly, raising input member 35 or lowering feedback members 40 from the illustrated positions disposes lines 80 and 90 in fluid communication with supply line 45 and disposes passages 85 and 95 in communication with drain line 50 thereby pressurizing the lefthand ends of actuators 15 for adjusting the blade pitch in a decreasing pitch direction.

Each feedback member includes thereon a pin or cam follower 100 received within cam slot 105 provided in cam 110 which is pivotably mounted at 115. As shown, in the preferred embodiment cam 110 is of a bellcrank shape, cam slot 105 being disposed at one end thereof, the opposite end being connected to the associated blade by a link or tie rod 120.

When input member 35 is lowered thereby pressurizing the righthand ends of actuators 15 for increasing the blade pitch, the resulting blade pivoting pulls upper link 120 to the right and pushes lower link 120 to the left thereby pivoting cams 110 which slide feedback members 40 downwardly along input member 35 to the null position thus arresting further pitch change adjustment of the blades. In like fashion, raising input member 35 for pressurization of the lefthand ends of actuators 15 causes the blades to pivot in a decreasing pitch direction thereby pushing upper link 120 to the left and pulling lower link 120 to the right. Such link movements pivot cams 110, raising feedback members 40 along input member 35 to the nulled position and arresting further blade pitch adjustment.

While a mechanical connection between the blades and the feedback members has been shown, it will be appreciated that the feedback members may be operated by hydraulic or electric means actuated by blade pitch change movement without departing from this invention.

Therefore, it will be appreciated that the blades are hydraulically phased by the relative orientation of the input and feedback control valve members rather than mechanical linkages connecting the blades themselves. Accordingly, it will be appreciated that the blade pitch control system of the present invention may be of substantially lighter weight and less cost than prior art slide block, gear set, or cam-bevel gear blade phasing mechanisms.

Input member 35 is actuated by any suitable means, in the preferred embodiment this means comprising an hydraulic control valve actuator 125 having an output member or piston 130 pivotally connected to one end of a connecting means or lever 135 which, on the other end thereof, is pivotally connected to input member 35. Lever 135 is fulcrumed at 140 a location stationary during normal conditions of operation. Reciprocal movement of actuator piston 130 pivots lever 135 about fulcrum 140 thereby reciprocating control valve input member 35. Operation of actuator 125 is controlled by a servo valve 145 which selectively connects opposite ends of actuator 125 to main supply and drain lines 55 and 60 respectively in any manner well known in the art. Servo valve 145 is in turn operated by suitable electrical or fluid mechanical controller 150. In the preferred embodiment, controller 150 is of the electrical variety being connected to servo valve 145 through electric lines 155. The controller selects the desired blade pitch angle according to various inputs 160 based on prevailing operating conditions of the bladed apparatus. If the apparatus is an aircraft propeller such operating conditions may include airspeed and engine speed. Similarly, where the bladed device is a wind turbine, inputs 160 may include such operating parameters as prevailing wind speed, power output of the wind turbine and the like. A feedback signal is provided controller 150 by a suitable electrical feedback device such as linear variable displacement transformer (LVDT) 165 connected to the controller through electric lines 170. In a manner well known in the art the LVDT includes a movable core connected to one of the cams 110 by a tie rod 175. Movement of the transformer core causes variation in the output of the transformer indicative of the displacement of cam 110 and thus the actual change in blade pitch.

The blade pitch actuation system of the present invention may include a feather control system shown generally at 180. The feather control system comprises a feather valve 185 having a rectilinearly movable spool 190 pivotally connected to lever 135 at fulcrum 140. Spool 190 is biased downwardly (in an increased pitch or feather direction) by a spring 195 interposed between the spool and the upper end of the valve housing. The spool is maintained in a stationary position against the bias of spring 195 by hydraulic fluid from supply line 55 and line 200, this fluid being applied to a lower portion of the spool opposite that engaging spring 195. It will be seen that in the event hydraulic fluid pressure is lost, spring 195 will urge spool 190 downwardly thereby moving control valve input member 35 downwardly in an increasing pitch or blade feathering direction. The feather control system may also be provided with a secondary source of pressurized hydraulic fluid 205 communicating with feather valve 185 through line 210 and with a servo actuated control valve 215 through line 222. Control valve 215 is also disposed in fluid communication with a blade actuator 225 which may be either a separate actuator used only in blade feathering or one of the actuators employed for normal blade pitch adjustment. Actuation of valve 215, in the event feathering is required, channels hydraulic fluid from the secondary source 205 to feather valve 185 through lines 222 and 230 it being seen that line 230 includes as part thereof a recess 235 in spool 190. Such pressurization of feather valve 185 along with the normal biasing of spring 195 causes the spool to move downwardly against the hydraulic fluid pressure applied to the lower face of the spool. Such downward movement of the spool causes the pressurization of actuator 225 through lines 210 reduced portion 235 of spool 190, line 230 and control valve 215, such pressurization of cylinder 220 ultimately effecting the feathering of the blades.

While a single feather system has been shown, it will be appreciated that plural feather systems (one for each blade) may be provided. Accordingly, since the blades are connected hydraulically rather than mechanically, the blades may be feathered independently of one another and therefore independently of any jammed blades, without regard to the blade phasing.

While there has been described a preferred embodiment of the blade pitch actuation system of the present invention, it will be appreciated that alternate embodiments may suggest themselves to those skilled in the art and it is intended by the appended claims to cover such alternate embodiments as come within the true spirit and scope of this invention.

I claim:

1. A pitch actuation system for adjusting the pitch of a plurality of blades, said system comprising a plurality of hydraulic actuators, each being associated with, and connected to a single blade, for driving said blade in a pitch-change mode of operation, said system further comprising a control valve in fluid communication with said actuators and a primary hydraulic fluid source, said control valve comprising an input member in fluid communication with said hydraulic fluid source and a plurality of feedback members each in fluid communication with one of said blade actuators, said input member, in response to a command signal thereto, being positionable into fluid communication with said feedback members for supplying hydraulic fluid therethrough to said blade actuators for the operation thereof, operation of said blade actuators in response to hydraulic fluid admitted thereto through said input and feedback members causing the positioning of said feedback members out of fluid communication with said input members thereby nulling said control valve and arresting further operation of said blade actuators for maintenance of a desired blade pitch setting.

2. Blade pitch actuation system according to claim 1 wherein said blade actuators are connected to said feedback members in driving relation thereto for positioning of said feedback members in said nulling of said control valve.

3. Blade pitch actuation system according to claim 2 wherein said control valve input member is received within said feedback members in sliding engagement therewith, said input member including a pair of passages therein connected to said primary hydraulic fluid source and drain, said passages including outlet portions opening to the surface of said input member; said feedback members each including a pair of passages therein, each disposed in fluid communication with said blade actuator and adapted for selected registry with said input member passages.

4. Blade pitch actuation system according to claim 3 wherein said input member includes stops thereon, adjacent stops defining a portion of said input member received within one of said feedback members, the surface of each of said received portions including a pair of drain outlets and a source outlet in such relative disposition that one of said pair of feedback member passages is disposed in registry with one of said drain outlets when the other of said pair of feedback member passages is disposed in registry with said source outlet.

5. Blade pitch actuation system according to claim 4 wherein said control valve input and feedback members are rectilinearly positionable along one another, and wherein each of said feedback members includes a cam follower thereon, said blade pitch actuation system further including a cam associated with each of said feedback members, said cam being operatively connected to an associated blade and engaging one of said followers, adjustment in blade pitch effecting pivotal movement of said cam and rectilinear movement of said feedback member over said input member.

6. Blade pitch actuation system according to claim 1 and further including a control valve actuator and connecting means, said input member being positioned by said control valve actuator connected to said input member by said connecting means, said blade pitch actuation system further including a feather control system comprising a feather valve coupled to said connecting means for positioning said input member to effect operation of said blade actuators in a blade feathering mode of operation.

7. Blade pitch actuation system according to claim 6 wherein said connecting means comprises a lever pivotally connected to said control valve input member, said control valve actuator and said feather valve including rectilinearly driven output members pivotally connected to said lever such that actuation of said output members rectilinearly repositions said control valve input member.

8. Blade pitch actuation system according to claim 7 wherein said feather valve includes an output spool biased in the direction of actuation thereof, said output spool, under normal conditions wherein feathering of said blade is not required, being maintained in unactuated condition by the pressurization of said output spool with hydraulic fluid from said primary source.

9. Blade pitch control system according to claim 8 wherein said feather control system further includes a secondary source of pressurized hydraulic fluid and a feather control valve in fluid communication with said secondary source, said feather valve, and at least one feather actuator adapted to drive said blades in a feathering mode of operation; said feather control valve, under conditions requiring feathering of said blades, channeling hydraulic fluid from said secondary source to said feather valve against said pressurization thereof by said primary source fluid to effect actuation of said feather valve and channeling of hydraulic fluid from said secondary source to said feather actuator.

10. Blade pitch control system according to claim 9 wherein said feather actuator comprises an actuator distinct from said actuators driving said blades in said pitch change mode of operation and capable of feathering said blades regardless of the relative phasing thereof.

11. Blade pitch control system according to claim 7 wherein said control valve actuator comprises an hydraulic actuator the output member thereof comprising a reciprocable piston selectively positioned within said control valve actuator by the pressurization of said control valve actuator with hydraulic fluid from said primary source thereof.

* * * * *